July 21, 1970     A. WEISS     3,521,300

AUTOMATIC ELECTRIC SELF-SYNCHRONIZING POLARIZING WINDOWS

Filed Aug. 11, 1967     4 Sheets-Sheet 1

INVENTOR
Alvin Weiss

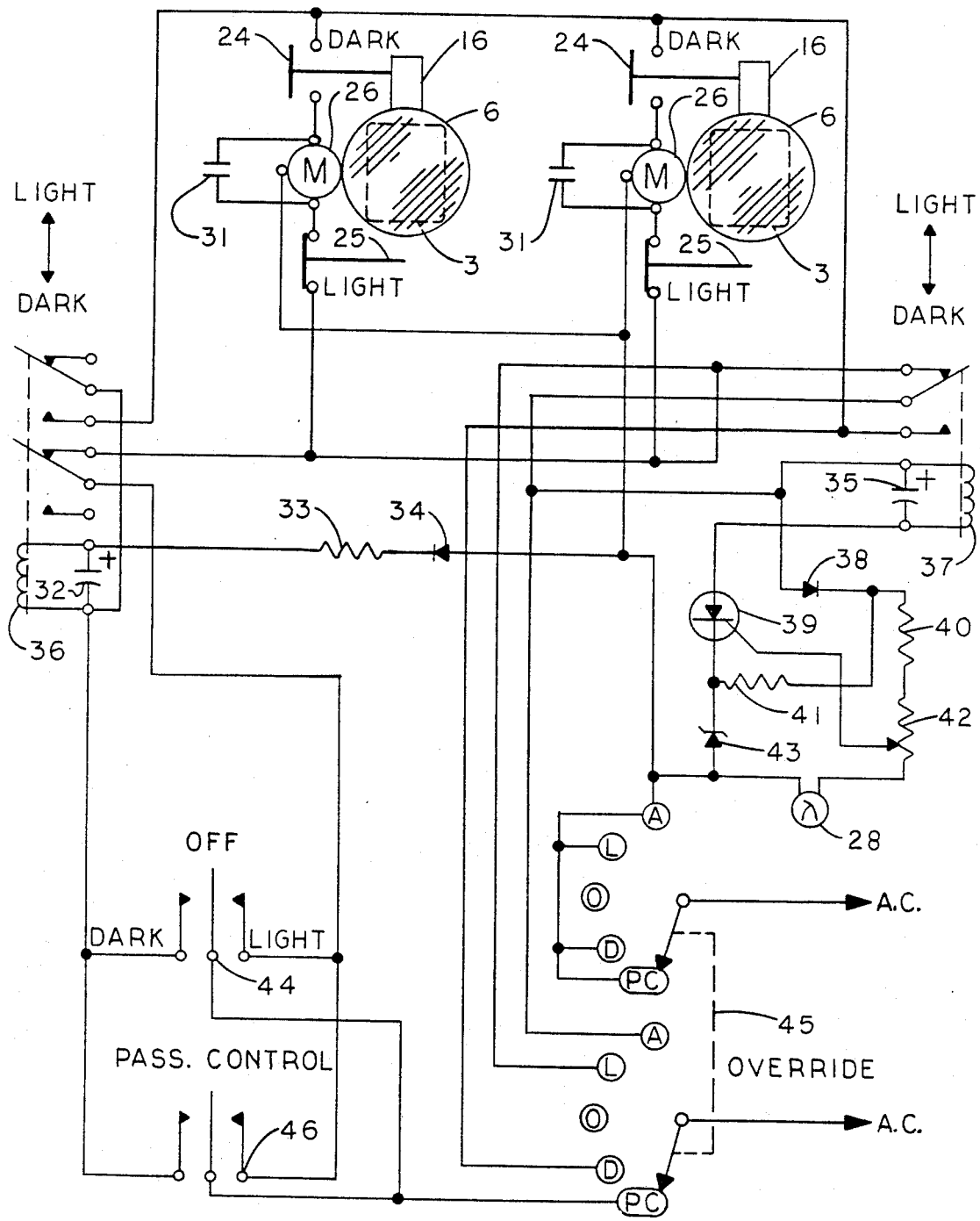

United States Patent Office 3,521,300
Patented July 21, 1970

3,521,300
AUTOMATIC ELECTRIC SELF-SYNCHRONIZING POLARIZING WINDOWS
Alvin Weiss, 342 N. Cordova, Burbank, Calif. 91505
Filed Aug. 11, 1967, Ser. No. 660,115
Int. Cl. G02f 1/18; H01j 39/12
U.S. Cl. 250—225          4 Claims

ABSTRACT OF THE DISCLOSURE

A first polarizing window element is positioned over a window opening in the wall of an aircraft cabin and fixedly attached to the cabin wall. A second polarizing window element is positioned over this opening in overlying relationship to the first element, this second element being supported for rotation relative to the first. The rotatable element is circular and is rotatably driven by means of a friction roller drive which engages the rim thereof. The amount of light entering the cabin through the window is controlled by rotating the rotatable element relative to the fixed element, either by means of a manual control or in response to a light sensitive detector.

---

This invention broadly relates to improving passenger comfort, psychological well-being, safety, and convenience, as well as relieving aircraft maintenance conditions through the use of automatic electric self-synchronizing polarizing windows. Although this invention is more directly aimed at aircraft usage, it is also intended towards buildings, dwellings, ships, other vehicles, and more importantly, aerospace vehicles.

By electrically rotating one polarizing filter with respect to another, light transmission from a light source to the interiors of any of the aforementioned vehicles or structures may be infinitely controlled by automatic and electrical means. Basic intent is to reduce glare and eliminate shades, drapes, curtains, etc. through automatic and electrical combined means and provide a practical polarizing window system as is herein described.

The broad concept of variable density windows was initiated by E. H. Land and described in U.S. Pat. No. 2,311,840, granted him Feb. 23, 1943. Other polarizing windows are revealed in U.S. Pat. Nos. 2,423,321 and 2,464,954, granted to S. C. Hurley, Jr. and L. A. Werth, respectively, on July 1, 1947, and Mar. 22, 1949, to which reference may be made for a more complete description.

The basic intent of this invention as previously outlined, is accomplished by novel means of achieving the goals set forward herein, by the use of the latest state-of-the-art devices and materials, which are utilized in making it a more feasible device for more practical present and future application.

Amongst the advantages of this invention is the capability of preventing passage of ultra-violet rays through the variable density windows or to the polarizing elements. Ultra-violet rays from the sun will normally fade the polarizing elements within a short time, thus making them useless and impractical. This invention eliminates this problem of ultra-violet ray damage in such a manner so as to protect the polarizing elements as well as protecting interior materials and fabrics from fading, which additionally enhances its practicality, and is applicable regardless of the polarizing attitude of the polarizing filters.

During flight, airline passengers are psychologically protected from the claustraphobic effect of closed shades, since some exterior light is always visible, even in the minimum light transmittance attitude of the polarizers— which shall hereinafter be known as the Dark position.

This invention has the capability of being electrically adjusted to the arbitrated comfort of neighboring passengers in the event one wishes to sleep or watch TV., while the other is desirous of gazing out the window. This is accomplished by the passenger control switch which may be normally spring loaded off, and pressed to actuate one or more windows to either the Dark position, maximum light transmittance position (hereinafter known as the Light position) or any infinitely desired light transmittance level between, and remain stationary at that level. The passengers may also have an on-off type switch with an integral potentiometer control for the automatic function.

The intent of the automatic function is to provide an automatic override which causes the windows to go dark when external light exceeds the minimum glare level potentiometrically selected. When external glare drops below the selected level again, the windows automatically return to the Light position for further passenger readjustment to desired levels.

It is presumed that within a building, aircraft, etc., illumination will not vary considerably, rapidly, or constantly as a result of external light changes. Likelihood of frequent adjustment is not anticipated. However, to satisfy requirements arising wherein a constant light transmittance is desired, it is intended that this invention will cover same by slight mechanical and electrical modification. The automatic feature is provided as a convenience allowing one to be preoccupied with something else while the windows make their own adjustment.

An automatic feature is well described in general as applied to polarizing devices in U.S. Pat. Nos. 2,417,883, granted to S. Oschin, Mar. 25, 1947; 3,159,844, granted to R. C. Haboush, Dec. 8, 1964; 2,548,230 granted to C. P. Molyneux, Apr. 10, 1961; 2,755,700 granted to G. Ljungstrom, July 24, 1956; 2,134,414, granted to A. S. Norcross, Oct. 25, 1938; 2,453,693, granted to C. W. Armstrong et al., Nov. 16, 1948; and Nos. 2,423,- 321 and 2,423,322, granted to S. C. Hurley, July 1, 1947.

It may be noted that previous inventions offer a light polarizing means, automatic in nature, which respond to a light activated device. However, none of these offers:

(1) A complementary electrical feature for achieving infinitely desired stationary positions between Dark and Light, (2) Utilize solid state circuitry, or (3) Have a temperature stabilized circuit for preventing drift in relay operation.

Stable reaction of the circuit to temperature variation is equally as important as it is to light intensity variation, particularly in fast rising aircraft or constantly rotating space vehicles.

The pilot and hostess may have an override switch which would allow them to take control from the passengers during an emergency, or to darken an entertainment center showing movies, or as a signal device, or at any other time when its function would be utilizable.

This invention eliminates the need for shades, which are constantly being ripped, torn, soiled, and broken, presenting a high maintenance problem for the airlines.

One object of this invention is to provide a self-synchronizing feature when two or more polarizing windows are used in conjunction with each other. The desirability of keeping two or more polarizing windows in sync on the sides of an airplane, building structure, or other vehicle, is often needed for practical reasons as well as for purely aesthetic ones.

By "In Sync," we are referring to the capability of maintaining the same level of light transmittance through two or more polarizing windows, remote from each other at all times regardless of the light transmittance desired, either electrically or automatically.

Another objective is to provide a spring loaded mount to provide for wear on the rotating polarizing filter. Shock mounting is particularly advantageous for this device with respect to shock, vibration, and other inertial forces imposed on aircraft and other moving vehicles. In the case of buildings and other structures, shock mounting wards off most of the ravages of earthquakes and sonic booms, partly due to a change in the resonant frequency of the windows.

An added feature is a detachable wiper blade, which may be installed on either the rotatable polarizing filter, an adjacent window, or both, to remove condensation during the rotating polarizing action, if conditions necessitate its usage. The wiper blade is of particular value on outer space vehicle windows, which are constantly encountering this problem.

An important objective is the automatic function, initiated by control switch selection and one or more light sensing devices. The circuit is solid state, including the firing threshold or switching portion, with all the inherent advantages of solid state devices.

Another possible control is to have external light intensity automatically drive the normally stationary, non-rotatable window or windows to an intermediately desired light transmission level proportional to the light received, provided that the motor circuits are overridden and not allowed to rotate, while the non-rotatable windows now rotate by spring-loaded electro-magnetic means or solenoid. These not being illustrated, but also included by intent as a portion of this presentation.

The objective of the drive system is to provide a friction drive against one or more rotatable polarizing filters by a reversible motor or gearmotor, which allows for the advantage of a clutch type action in the event of mechanical or electrical difficulties. One motor may directly drive two polarizing filters at the same time, or more than two through belt friction drive, allowing slippage on one window at the end of its Dark or Light limit switch travel, while another syncs up, in the event of an out of sync situation. As indicated, the motor friction drive may be direct, or may use one or more belts, allowing the motor to be remotely located in order to avoid structural obstructions, or to gang drive a series of windows.

One of the most important objectives is the use of Plexiglass II or similar ultra-violet ray retardant materials, glass, or coatings between the light source and the polarizing filters. Most plastics and glass allow ultra-violet rays through, causing the polarizers to fade or bleach in such a short time and to such an extent as to become practically useless.

Another particularly important objective is to proffer a temperature compensating circuit for the light sensor. As already mentioned, this is probably as important for an automatic feature as is the capability of the circuit to react to varying external light intensities. In addition to temperature compensation, the circuit illustrated allows for a small circuit difference of only about one volt between relay pull-in and drop-out, requiring a relatively non-sensitive relay. This is not to say that a solid state device such as a silicon controlled rectifier could not be used in place of a relay. Also, although the circuit illustrated indicates an A.C. input, it is within the scope and intent of this invention also to operate on a D.C. input, probably using a solar cell to drive a two stage transistor amplifier for altering the light signal to the ultimate automatic polarization of the windows.

A final objective is to provide a mechanical or electrical demand means for biasing the light intensity level at which the light sensing device will accordingly react. This feature allows adjustment for individual comfort insofar as the arbitrary level of too much glare is concerned during automatic light sensing operation. Although not illustrated, it may be readily understood that biasing of the incoming light signal may easily be accomplished mechanically simply by having an adjustable cover of sheet metal over the light sensing device, adjusted to block out light as desired.

Although the aforementioned presents the major advantages, novel features and objectives of this invention, it should be understood that construction and arrangement of parts, as well as circuitry, are illustrative of the basic concepts and principles of the invention and are not to be construed as limiting in nature or scope, being within limits of the spirit of the invention.

It should also be contemplated within inventive intent and within the same vein that certain parts, mechanical or electrical, may be deleted if not warranted by conditions necessitating their use, or requirement.

With the foregoing and further objects in view which shall materialize as the description is forged, the invention consists of additional novel details of circuitry, parts, and arrangement, hereinafter more specifically described, illustrated, and pointed out in the claims.

Referring to the drawings:

FIG. 1 is a vertical section view constructed in accordance with the features of my invention. This view is presented as though cut with some imaginary section line from a front elevational view. The purpose is to show the various major parts in the most comprehensible manner possible.

FIG. 5 is a schematic illustration of the principles of my invention. An A.C. input is required to enable usage of the circuit represented. The temperature compensating, firing threshold portion of the circuit is represented by a group of components clustered in one area of the schematic for clarity. In retrospect, this highly sensitive portion of the circuit eliminates a need for a light amplifier.

Figure 1:
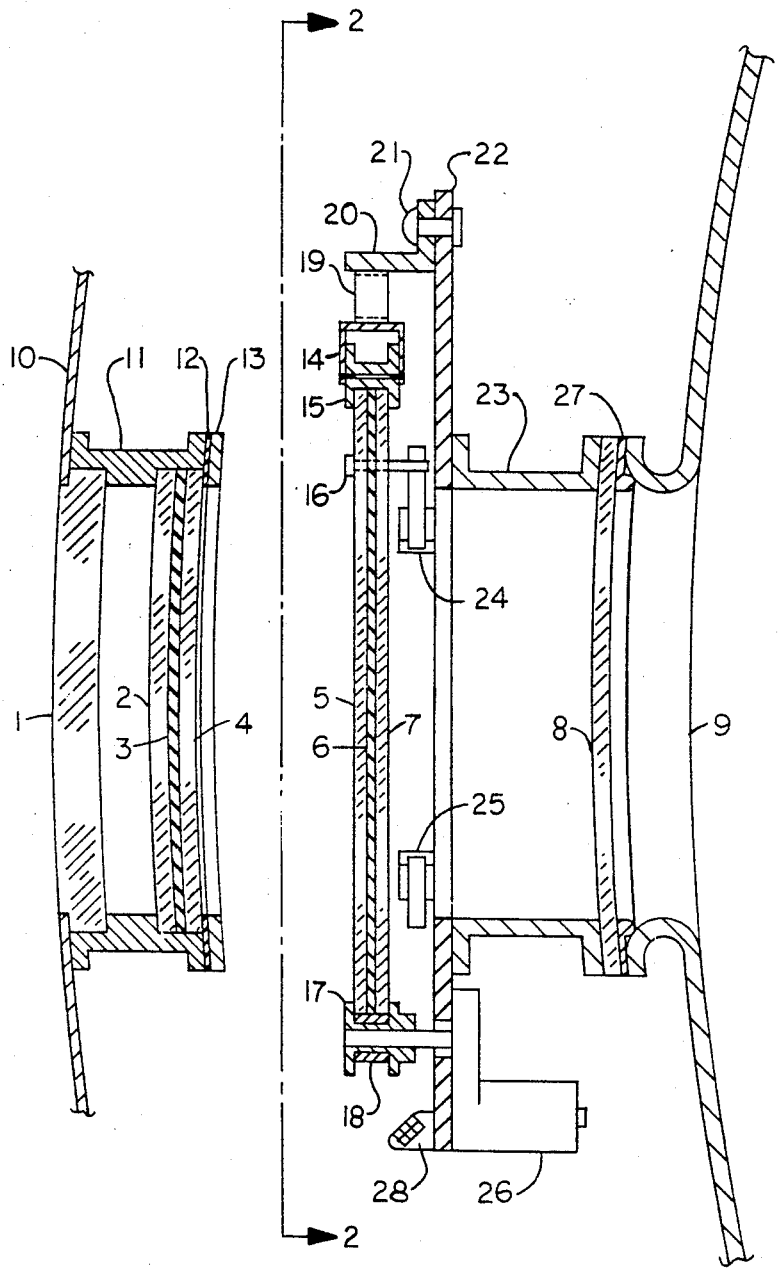

Reference is made to FIG. 1 which illustrates one possible general arrangement of parts for use on aircraft. Working inboard, sunlight passes through the opening in fuselage skin 10 and through outer window 1. Outer window 1 is pressure sealed between fuselage skin 10 and frame 11, and this window may be made of Plexiglass II, or other suitable transparent material capable of blocking ultra-violet rays.

After passing through window 1, the sunlight is enshrouded by frame 11, and then passes through stationary plastic polarizing window laminate 2, polarizing element 3, and plastic laminate 4, which are the laminates comprising the inner, or acoustic window. Laminate 2 may be of Plexiglass II instead of, or along with window 1, to block ultra-violet rays. Removable frame 13 pressure seals the stationary inner window in place with gasket 12.

The sunlight then passes through the inner rotating polarizing filter, made up of plastic laminate 5 and plastic laminate 7, sandwiched over polarizing element 6. The light continues through the clearance hole in mounting plate 22, is enshrouded by inner frame 23, subsequently passes through passenger scratch window 8, and finally emerges through the opening in reveal 9. All parts from the inner polarizing filter inboard, are mounted to reveal 9, with dust seal 27 adding to the shock absorbing end.

The amount of sunlight passing into the cabin is dependent on the rotary position of the inner polarizing filter about an approximate 90° arc. Reversible gearmotor 26 transmits torque through rubber friction drive ring 18 on drive roller 17 to cause the inner polarizing filter to rotate. Drive ring 18 could be eliminated if drive roller 17 was made entirely of rubber.

In this view and in succeeding views and descriptive matter, maximum light transmission occurs when lower limit switch 25 is tripped by trip pin 16 and minimum light transmission occurs when upper limit switch 24 is tripped. This is because stationary polarizer element 3 and rotatable polarizer element 6 have their polarizing axis parallel in the former position, and crossed in the latter position.

Idler roller 15 is mounted in idler roller clevis 14 and exerts a downward force dependent on the spring rate of spring 19. Pivot bar 20 pivots about pivot pin 21. Light senser 28 receives light piped downw through the inner rotating polarizing filter.

All of the laminates and windows are presumably made of clear, transparent plastic material for aeronautical safety reasons. The laminates sandwiching the polarizing elements provide structural rigidity.

Figure 2:
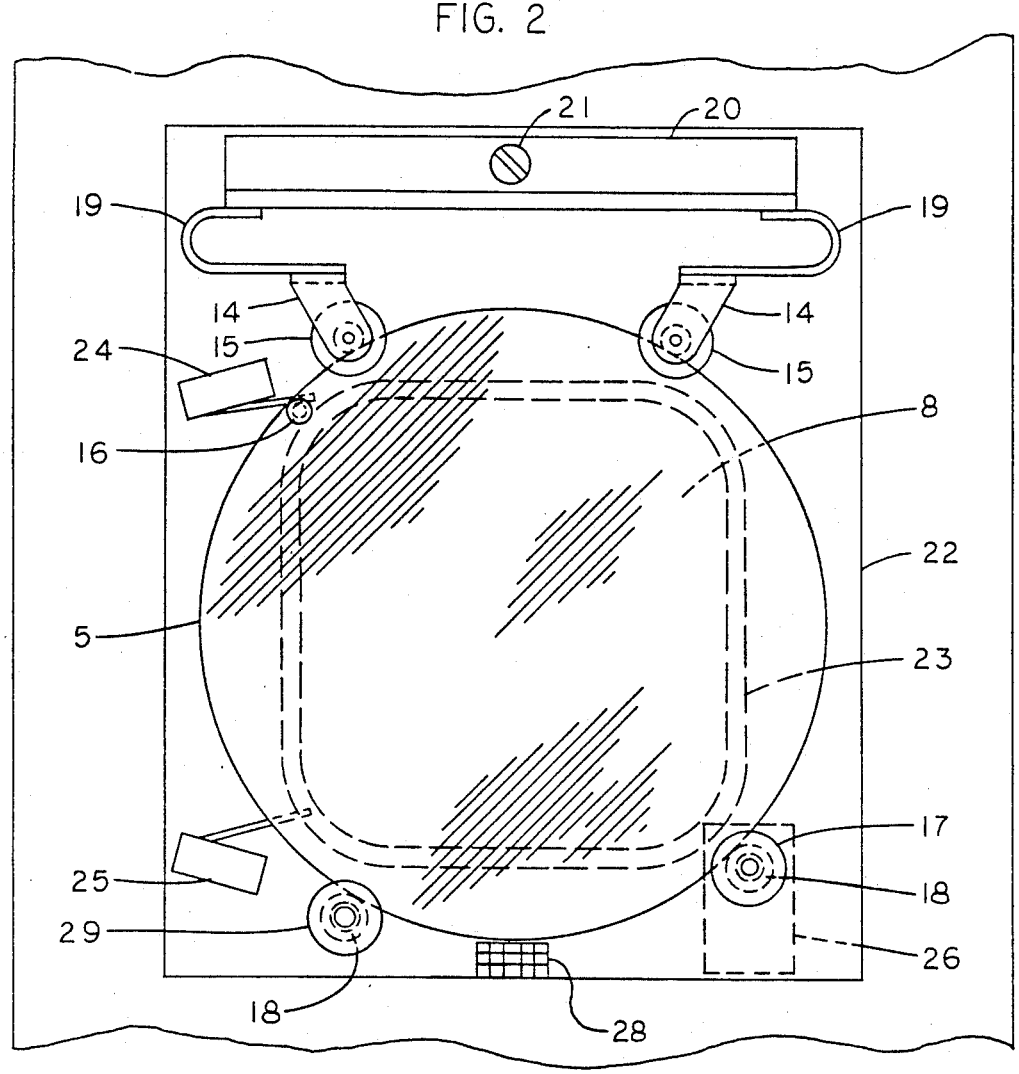
FIG. 2 is a front elevational view taken along the direction indicated by the arrows towards 2—2 in FIG. 1. The purpose of this view is to show the more important parts of this invention and their actual respective positions.

Referring to FIG. 2, it may be seen that pivot bar 20 will equalize spring forces on the two 19 springs to the two idler rollers. This action causes equal wear on the two 15 idler rollers, acts as a shock mount, insures positive traction on the top edge of the inner polarizing filter, prevents rattling, and insures positive traction on the lower rollers. This spring force is transmitted through the inner polarizing filter to provide a frictional force against rubber friction ring 18 on drive roller 17 and rubber friction ring 18 on idler roller 29, and may be adjusted by raising or lowering pivot pin 21. Rubber friction ring 18 also aids in minimizing shock and vibration.

This view indicates that all of the windows, frames, seals, gaskets, and the stationary polarizing window may be rectangular instead of round, or otherwise, so long as the viewing area is circumscribed by the rotating polarizing filter. This view did not include parts further outboard because further illustration of those parts would only obstruct clarity of the major portion of the device.

Figure 3:
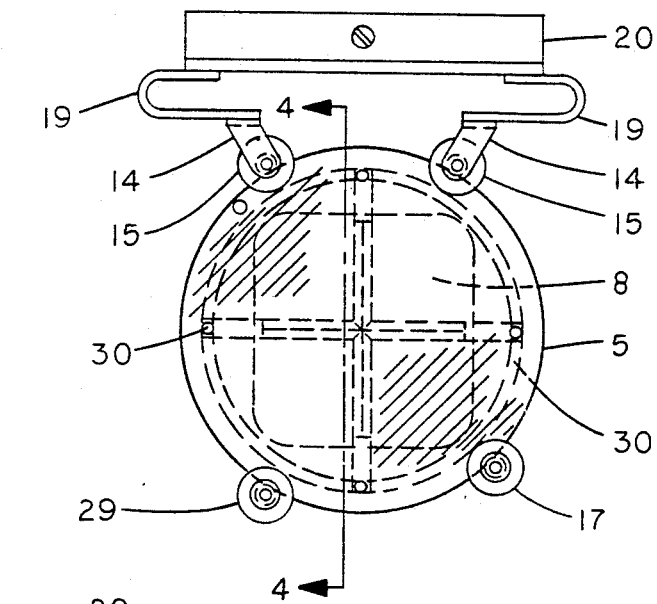
FIG. 3 is a partial elevational view showing sufficient detail only to illustrate the principles of the removable window wiper.

FIG. 3 shows the rubber window wiper 30 applied against the outboard side of passenger scratch window 8. As is indicated, the four wiper arms will cover the entire circular window area contacted each time the window rotates 90° from the light to dark or vice versa. A round window configuration would obviously receive greater coverage than rectangular. Four small knobs, nearside in this view, hold the window wiper 30 to the inner polarizing filter.

Figure 4:
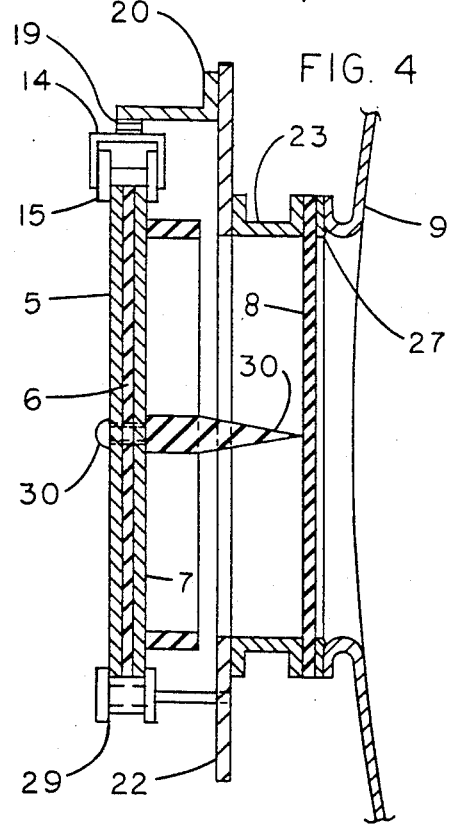
FIG. 4 is a fragmental section view taken along the direction indicated by the arrows towards 4—4 in FIG. 3. This view illustrates one of the four wiper portions and fastening of the wiper assembly to the rotating polarizing filter assembly.

FIG. 4 indicates the manner in which window wiper 30 is mounted to the inner polarizing filter. The four rubber knobs protrude through clearance holes and hold the window wiper 30 in place by friction and gripping action under the heads of the knobs. If warranted by conditions, the window wiper could be exerted against a window on the other side of the inner polarizing filter, or both sides. Condensation is dropped from the ends of the wipers, which describe a circular motion within the internal boundaries of frame 23.

FIG. 5 illustrates an A.C. input to energize a two window polarizing system. With the passenger override selector switch 45 in the "PC," or Passenger Control position, the passenger control switches 44 and 46 may be operated. The passengers do not have the capability of an automatic function with the circuit shown. Also, if two passengers try for opposite light functions at the same time, the one desiring Dark will supercede the one desiring Light. This situation can be reversed by slight circuit alteration.

When the passenger wants the windows to go darker, he depresses passenger control switch 44 or 46 until a satisfactory degree of darkness is achieved. These switches are momentary in the dark or light position, and normally off. If he wishes the windows to go fully Dark, he maintains the switch in the dark position and limit switch trip pin 16 will open upper limit switch 24 on both window assemblies, stopping the two reversible motors automatically when full Dark is reached by the rotating inner polarizing filters. The inner rotating polarizing filter is indicated by 6 on the schematic, and the stationary polarizing window is indicated by 3. Motor 26 is shown, but friction drive roller 17 is not. Any number of polarizing window assemblies, override switches, or passenger control switches can be electrically paralleled to the rest of the circuit shown.

When either of the passenger control switches is depressed in the dark position, relay 36 is energized by a half wave signal thru diode 34 and resistor 33. Half wave rectification allows polarized capacitor 32 to function within this portion of the circuit as intended. Relay 36, resistor 33, and capacitor 32 create an LCR network providing a small time delay for actuating relay 36. This time delay prevents undue load on reversible motor 26 and gear train, if any, in the event the passengers abusively play with the passenger control switches.

Gearmotors are advocated because they attenuate towards better synchronization at starting and stopping. Capacitor 31 is a motor starting capacitor. If too many window adjustments are made without bringing the inner polarizing filters to the full Dark or Light position, they tend to get out of synchronization. That is, one window could actually get dark at the same time the other works itself to a light position because of differences in motor start-up, stop, and system friction. As may be seen in this circuit, the inner polarizing filters will at least re-sync any time they are directed to full Dark or Light. Synchronization is positive with this circuit.

In the light position of passenger control switch 44 or 46, relay 32 coil is bypassed by the signal. This signal passes across relay 32 contacts only and then through lower limit switch 25 to cause the windows to get lighter. Limit switch trip pin 16 opens the circuit, automatically stopping motor 26 in the Light position when either of the passenger control switches is constantly held closed.

All positions on override selector switch 45 are constantly maintained positions. As mentioned before, the PC position allows the passengers to control the windows. The D for dark and L for light positions on override selector switch 45 work the same as the passenger control switches except, the control functions are normally maintained instead of being momentary. The off position on any switch immediately stops the motor when selected and facilitates operating the windows when located between the dark and light positions.

When A for automatic is selected, the windows stay light until external light becomes so bright as to actuate the temperature compensating, firing threshold portion of the circuit, causing the windows to automatically go dark. The high sensitivity of this portion of the circuit eliminates the need for an amplifier.

With A.C. across the circuit, diode 38 provides half wave rectification to allow silicon controlled rectifier 39 to gate on as determined by light intensity on light sensitive device 28, and the setting of potentiometer 42. In this case, the light sensitive device is probably a photocell.

Temperature stability of the automatic portion of the circuit is provided by Balco wirewound resistor 40, Zener diode 43, and resistor 41. Capacitor 35 acts as a filter for relay 37, which energizes the rest of the window circuitry.

Zener diode 43 acts as a reference with resistor 41 and the various other components of this portion of the circuit to maintain SCR39 at a firing threshold each half wave, when light intensity decreases resistance across photocell 28 sufficiently. Because of Balco resistor 40, stability of the circuit is maintained such that the difference between pull-in and drop-out of relay 37 will be less than one volt through large temperature variations.

It is readily seen that a tendency to drift due to temperature variation on the coil of relay 37, is aborted by the isolated nature of the energizing portion of the circuit. The firing threshold level may be potentiometrically controlled by the pilot, hostess, and/or as a separate control of the passenger by varying potentiometer 42. One basic circuit may control the polarizing windows on one or more sides of an airplane, building, structure, or other type vehicle.

The basic intended premise of the entire circuit is a solid state circuit providing a polarizing window system which allows for temperature stability, self-synchronization of all windows, automatic operation with adjustable setting, a time delay for motor and mechanism protection, an override capability, and a capability of stopping the windows at any desired intermediate light transmittance level between Light and Dark. Although the solenoid or other similar electro-mechanical automatic control features are not shown, it is obvious that they may be readily incorporated. It is also possible to utilize most of the concepts described herein for use with a photoelastic polarizing means. Consequently, it is intended that they be included within the periphery of the intent of my invention.

From the foregoing description, it is apparent that innumerable changes or modifications are possible within the electrical and mechanical portions of this invention. Such changes are to be considered as coming within the scope and spirit of my invention as defined by the following claims.

What I claim as new is:

1. A device for controlling the light passing through a window opening formed in the wall of an aircraft cabin comprising
   a fixed polarizing window element positioned over said opening and fixedly attached to said wall,
   a rotatable polarizing window element positioned over said opening and overlying said first element, said rotatable element being circular,
   means for rotatably driving said rotatable element relative to said fixed element including a drive roller having a friction drive ring for engaging the rim of said rotatable element, motor means fixedly attached to said wall for rotatably driving said roller, idler roller means rotatably supported on said wall and engaging the rim of said rotatable element, and spring means for resiliently urging said idler roller means against the rim of said rotatable element, and
   means for selectively energizing said motor means to rotate said drive roller.

2. The device as recited in claim 1 wherein said means for selectively energizing said motor means includes light sensitive detector means for detecting the light level in said cabin, a power source for driving said motor means, and control means responsively connected to said detector means for connecting said power source to said motor means to drive said rotatable element when said light level exceeds a predetermined value.

3. The device as recited in claim 2 wherein said control means comprises relay means interposed between said power source and said motor means, a power source for energizing said relay means, silicon controlled rectifier interposed between said power source and said relay means, said silicon controlled rectifier being connected to receive the output of said light sensitive detector, and means for biasing said silicon controlled rectifier so that said rectifier is gated on by the output of said detector when the light level exceeds said predetermined value.

4. The device as recited in claim 3 and further including limit switch means mounted on said wall adjacent to said rotatable element for interrupting the current path between said power source and said motor means when said polarizing elements are passing either maximum or minimum light, and pin means mounted on said rotatable element for actuating said limit switch means.

References Cited
UNITED STATES PATENTS

| | | | |
|---|---|---|---|
| 2,140,368 | 12/1938 | Lyle | 250—225 |
| 2,641,713 | 6/1953 | Shive | 250—211 |
| 3,281,965 | 11/1966 | Irwin | 350—159 X |
| 3,290,203 | 12/1966 | Antonson et al. | 350—1 X |

JAMES W. LAWRENCE, Primary Examiner

DAVID O'REILLY, Assistant Examiner

U.S. Cl. X.R.

350—159